INVENTORS
WARREN M. MACEK
JOSEPH R. SCHNEIDER
BY
John H. Gallagher
ATTORNEY

INVENTORS
WARREN M. MACEK
JOSEPH R. SCHNEIDER
BY
John H. Gallagher
ATTORNEY

United States Patent Office 3,356,438
Patented Dec. 5, 1967

3,356,438
LIGHT MODULATOR EMPLOYING MULTIPLE-REFLECTIVE LIGHT PATH
Warren M. Macek, Huntington Station, and Joseph R. Schneider, Larchmont, N.Y., assignors to Sperry Rand Corporation, Great Neck N.Y., a corporation of Delaware
Filed June 12, 1963, Ser. No. 287,299
2 Claims. (Cl. 350—150)

This invention relates to means for amplitude modulating electromagnetic waves of very short wavelengths, such as those falling within the infrared, visible light, and ultra violet light regions of the frequency spectrum. In particular, this invention relates to an improved light amplitude modulator that achieves a significant improvement in modulation efficiency by permitting multiple passes of light through an electro-optic modulator.

Shutter-type light modulators are known in the art and in general include a polarization rotator for rotating the electric field polarization angle of linearly polarized light waves. A light polarizer is positioned at the light input to the rotator and a light analyzer is positioned at the light output of the rotator. As light is passed through the input polarizer and then the rotator, plane polarized light experiences a rotation of its electric field polarization angle as a function of a modulating electric or magnetic field that controls the rotator. The output of the rotator is incident upon the analyzer and the amount of light passed thereby is a function of the rotated polarization angle of the light, and thus of the modulating electric or magnetic field. A shutter-type modulator operating on a reflection principle has been described in the current literature. In this reflection device, a half mirror type of beam splitter is positioned between the polarizer and an electro-optic crystal polarization rotator, and a totally reflecting mirror is placed adjacent the opposite end of the crystal. The analyzer is positioned adjacent the beam splitter along a path at a right angle to the polarizer. A light beam passes through the input polarizer and the beam splitter, and traverses the crystal in both the forward and reverse directions due to the reflecting mirror, and in so doing the polarization angle of the linearly polarized light is rotated by double the angle that it would be rotated in a single pass through the crystal. The light beam emerging from the crystal then is partially reflected from the beam splitter and the component of the rotated light that is orthogonal to the polarization of the unrotated light passes through the ouput analyzer so that the resultant beam passing therethrough is amplitude modulated in accordance with a modulating signal applied to the crystal. The reflection device described is rather inefficient, however, because at least one-half of the light beam is lost in passing through the half-mirror during its first traversal of the crystal, and one-half the intensity of the remaining light beam is lost when it is reflected a second time from the half-mirror in order to direct it to the analyzer. The light that does not get through the analyzer represents a further loss in the system since it serves no useful purpose. Further, in order to achieve a high modulation index, the modulating electric field applied to the crystal must be relatively strong to assure sufficient rotation of the polarization angle of the light beam. When the polarization angle of the light beam is modulated at microwave frequencies, the electro-optic crystal is placed in the electric field within a resonant cavity. To obtain the high electric field strengths necessary to achieve the large rotation angles, high Q cavities are required. This in turn has the effect of limiting the bandwidth of the modulating frequencies.

It therefore is an object of this invention to provide an electro-optic light modulator that requires a relatively small electric field for the modulating signal.

Another object of this invention is to provide a simple and efficient reflection type electro-optic modulator.

It is a further object of this invention to provide an improved light modulator capable of operating at extremely high modulation frequencies without exceeding the power limitations of currently available electro-optic materials.

A further object of this invention is to provide an amplitude modulator external to a source of light wherein the magnitude of the modulated light and its modulation index is increased by means of a multiple reflection light path within the modulator.

In accordance with this invention, the light modulator is comprised of a non-resonant doubly-reflective light path formed by two longitudinally spaced mirrors, one of which is partially transmissive to admit light axially into the light path. An electro-optic crystal is disposed between the mirrors in the path of the axially directed light. A microwave electric field within a microwave cavity in which the crystal is placed controls the magnitude of the electro-optic effect of the crystal to induce polarization rotation of plane polarized light waves propagating through the crystal, the magnitude and rate of polarization rotation being proportional to the magnitude and frequency of the microwave electric field. A beam splitter, such as a Glan-Thompson prism is positioned within the light path to permit plane polarized light waves of a first polarization angle to propagate back and forth between the mirrors of the non-resonant doubly-reflective light path, and reflects transversely from the light path the component of the rotated light waves that is polarized orthogonally to the first polarization.

Significantly-improved modulation and intensity efficiencies are achieved in the modulator of this invention because the nonrotated component of light within the light cavity is not lost, as in known prior art light modulators, but in the modulator of this invention the unrotated component of light that is reflected from the input mirror and the light from the external source that enters the light path through the partially transmissive input mirror combine in such a way that the resultant light directed along the path from the input mirror is the sum of the intensities of the two. This summation continues with multiple reflections and significantly improves the efficiency of the device and permits greater modulation indices and higher modulaton frequencies than before possible.

The present invention will be described by referring to the accompanying drawings wherein.

Figure 1:
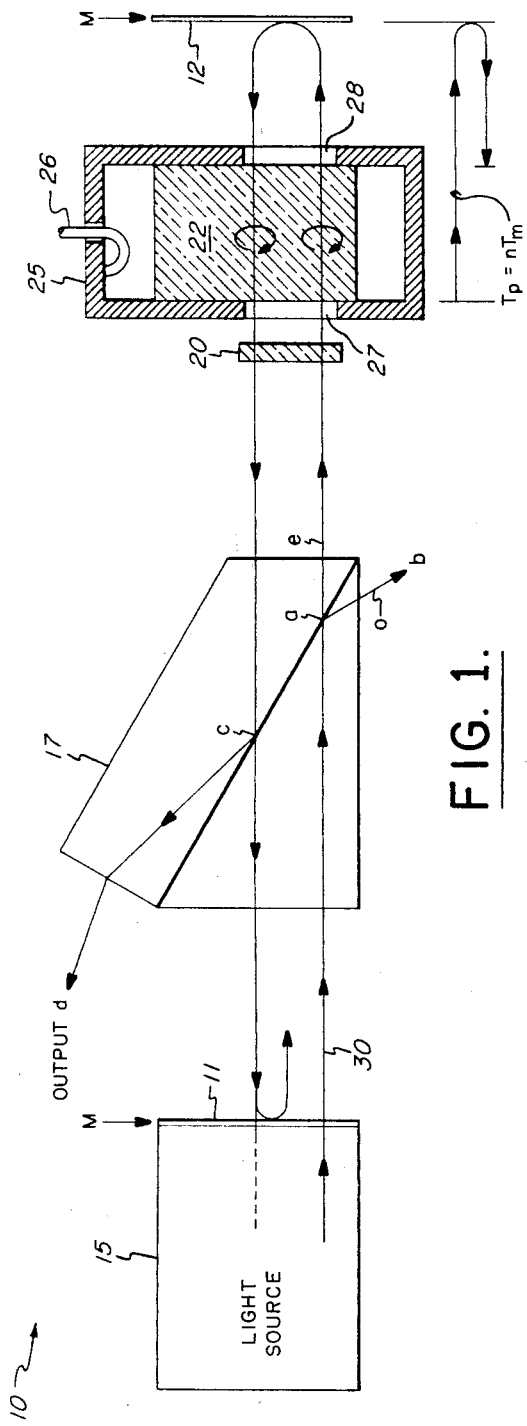
FIG. 1 is a simplified illustration of an embodiment of the present invention.

Referring now in detail to the drawings, an embodiment of the present invention is illustrated in simplified form in FIG. 1 wherein the light modulator 10 is comprised of two axially spaced mirrors 11 and 12. Mirror 12 is substantially totally reflecting and mirror 11 is partially transmissive to permit light from an external source 15 to pass therethrough. Mirrors 11 and 12 are aligned with respect to each other to provide a nonresonant multiple-reflective light path therebetween. Positioned adjacent to mirror 11 is a polarizer-analyzer device 17 such as a Glan-Thompson prism as illustrated, or a Nicol prism. Polarizer-analyzer device 17 functions to pass substantially without loss plane polarized light waves polarized in a first direction, vertically for instance, that is, the extraordinary ray, and transversely reflects orthogonally polarized light waves, that is, the ordinary ray. Polarizer-analyzer devices of the named types are described on pages 500–502 in the text Fundamentals of Optics, by Jenkins and White, published by McGraw-Hill Book Company, Inc., New York, N.Y., third edition, copyright 1957. Other known devices, such as stacked glass plates, also described in the cited text, may be employed as the polarizer-analyzer 17. The important consideration in this device is that the orthogonally polarized light component propagating from right to left along the light path not be absorbed but be reflected transversely from the axial path of the light.

A variable plane of polarization rotator 22 is positioned between an eighth wave plate 20 and mirror 12, and is located in the multiple-reflection path of the light propagating between mirrors 11 and 12. Rotator 22 may be any device that operates in response to a modulating electric or magnetic field to produce an effective rotation of the electric field of plane polarized light. The rotation may be due to the Pockles effect, Kerr effect, or Faraday effect, for example. For purposes of this discussion, the material of rotator 22 will be considered to be an electro-optic birefringent crystal of ammonium dihydrogen phosphate, or potassium d.hydrogen phosphate that produce rotation due to the Pockles effect.

The rotational effect produced by electro-optic crystal 22 is modulated in accordance with the microwave electric field within microwave cavity 25. Microwave energy is coupled into cavity 25 by coupling loop 26 and small light permeable apertures 27 and 28 in the walls of cavity 25 permit the passage of the light beam therethrough. Desirably, microwave cavity 25 is not a high Q cavity in order not to unduly restrict the bandwidth of the microwave modulating signal.

Light source 15 may be a source of coherent or noncoherent light. In one embodiment of the modulator of this invention, light source 15 was a laser light source and mirror 11 of modulator 10 actually comprised the output end mirror of the laser. This provided a compact and efficient arrangement for the external modulator of this invention.

In operation of the modulator of FIG. 1, a beam of light 30 from the light source 15 passes through partially transparent mirror 11 and enters polarizer-analyzer prism 17. The ordinary ray $o$ of the light beam 30 is reflected along the path $a$–$b$ and the extraordinary ray $e$ continues along the axial beam path through the prism. The beam of light emitted from polarizer-analyzer 17 now is substantially plane polarized at a first angle. Light propagating to the right from polarizer-analyzer 17 next passes through an eighth-wave ($\tau/8$) plate 20, which is a known device of a biaxial crystal which produces a 45° ($\tau/8$) phase displacement between the ordinary and extraordinary components of the linearly polarized light passing therethrough. The eighth-wave plate 20 functions to introduce a small amount of ellipticity into the polarization of the linearly polarized light waves and thus reduce the magnitude of ellipticity required to be produced by the electro-optic crystal. Eighth-wave plate 20 also serves to assure that the electro-optic crystal is operated in the linear portion of its response curve. The elliptically polarized light beam from eighth-wave plate 20 then enters electro-optic crystal 22 whose birefringence is varying in accordance with the strength and direction of the microwave electric field in microwave resonant cavity 22. The light passing through crystal 25 is resolved into two orthogonal components that travel with different velocities due to the birefringence of the crystal, and the two velocity modulated components emerge from the electro-optic crystal 22 and combine to form a single beam whose ellipticity is varying at the microwave frequency. This elliptically polarized light beam then is incident on totally reflecting surface 12 and is substantially completely reflected therefrom and again passes through electro-optic crystal 22 where the two resolved components again are delayed in phase by different amounts, the respective delays of the components being the same in magnitude and sense as in passing through the crystal the first time. The phase delays experienced by each one of the components in going through the crystal in opposite directions therefore is cumulative so that the degree of ellipticity in the polarization of an incremental packet of the light beam emitted from crystal 22 and propagating toward the left is double the ellipticity experienced in going through the crystal just once. The elliptical polarization of the light beam propagating to the left from crystal 22 will vary at a rate equal to the frequency of the microwave energy in microwave cavity 25, giving the effect of rotating the plane of polarization of the electric field of the light at the microwave frequency. The light beam then passes through eighth-wave plate 20 which introduces an additional 45° phase delay between the two components, thereby increasing the ellipticity of the light beam.

The light beam propagating to the left then passes through polarizer-analyzer 17 and the component of the elliptically polarized beam that is orthogonal to the first polarization is transversely reflected along the path $c$–$d$. The transversely reflected light along the path $c$–$d$ represents the useful output from the modulator, and its amplitude will be modulated at the frequency of the microwave energy in microwave cavity 25, and the modulation index of the output light beam will be a function of the electric field strength of the microwave energy in microwave cavity 25.

The unrotated component of the once-reflected light that is polarized at the first polarization angle and that passes through polarizer-analyzer 17 traveling toward the left then is incident on mirror 11 and a major portion of it is redirected along the axis of the multiple-reflective light path and commences another traversal of the path.

The optical characteristics of the multiple-reflective light path are chosen so that interference effects are avoided between the newly incoming light from light source 15 and the unrotated component of the earlier admitted light that is reflected from the input mirror 11. As a result, the intensities of the two light quantities are photometrically added, with the cross product terms averaging out to zero. This means that the requirement for spacial coherence of the light waves is avoided. Another way of stating this properly is to say that the multiple-reflective light path is nonresonant to the light waves. This characteristic of the light path may readily be achieved by providing light incident surfaces on the electro-optic crystal, on the mirrors, the beam splitter, and the biasing eighth-wave plate that are optically irregular, this irregularity being greater than some small fraction of the light wavelength. As an example, this fraction of a light wavelength may be of the order of one-eighth wavelength, although this is not to be considered critical. The important consideration is that spacial coherence of the light waves is to be avoided. The inherent inhomogeneity of the electro-optic crystal and the beam splitter will aid in achieving this desired characteristic.

The power build up of light within the non-resonant multiple-reflective cavity continues with multiple-reflections of the unrotated component of light until a steady state condition is reached. This build up of light power along the path, and the extraction of the modulated light in a transverse direction, rather than through a mirror, produces an output beam whose intensity is considerably greater than that obtainable in the nonreflective modulators and in the double-pass modulators of the prior art.

Figure 2:
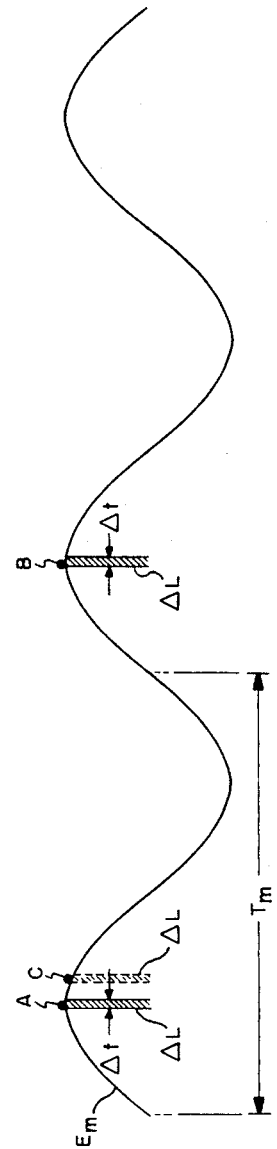
FIG. 2 is a diagram illustrating the propagation time of light through the electro-optic crystal employed in the modulator of this invention.

Further consideration must be given to the relationship between the light waves and the alternating electric field of the mirowave modulating signal in microwave cavity 25. Referring to FIG. 2, the sine wave E$m$ represents several wavelengths of the microwave modulating signal and $\Delta L$ represents a small arbitrary incremental portion or packet of the light beam, and $\Delta t$ represents the propagation time of the incremental packet of light in passing once through the crystal 22. As illustrated, the propagation time $\Delta t$ of the light packet $\Delta L$ must be short relative to the period $Tm/2$ of a microwave half wavelength in order that the microwave electric field does not reverse while the light packet is traversing the crystal. If the microwave field did in fact reverse while the packet of light $\Delta L$ was in the crystal, the rotational effect on the plane of polarization also would be reversed, thus reducing or eliminating the total rotational effect. This requirement also is necessary to permit the use of a wide frequency band of modulating signals. To further assure that this relationship is maintained between the polarity of the microwave electric field and the propagation time of an incremental packet of light waves, either one of two conditions must exist in regard to the relationship between the period of a microwave wavelength and the propagation time of an arbitrary packet of light from crystal 22 to end mirror 12 and back again. First, the time interval $T_p$ for an incremental packet of light to propagate from the left face of crystal 22, through the crystal to mirror 12 and back to the right face of crystal 22 must be substantially equal to an integral multiple of the period $Tm$ of a microwave wavelength in order to assure that the incremental packet of light will "see" substantially the same magnitude and polarity of the microwave electric field. This is illustrated in FIG. 2. The packet of light $\Delta L$ "sees" the microwave field at point A in passing through crystal 22 going from left to right, and "sees" substantially the same microwave field at point B on the next cycle when it again passes through crystal 22 going from right to left after reflection from end mirror 12.

The second possible conditon is that the propagation time $T_p$ of the light packet $\Delta L$ from the crystal 22 to end mirror 12 and back again is so short in relation to the period of a microwave half wavelength $(Tm)/2$ that the microwave electric field does not significantly change in magnitude or polarity. Ths condition is illustrated in FIG. 2 wherein the packet of light $\Delta L$ "sees" the microwave field at point A in passing through the crystal 22 from left to right, and "sees" the microwave field at point C on the same half wavelength in passing through the crystal from right to left after reflection from end mirror 12.

In the above discussion, reference has been made to rotation of the plane of polarization. As will be recognized by those skilled in the art, the birefringent electro-optic crystal described herein does not produce pure rotation such as results from the Faraday effect, for example, but rather the electro-optic crystal described produces elliptically polarized waves. However, the resulting operation of the device of this invention is the same for elliptically polarized waves as for truly rotated waves, and so for convencience of exposition, the term rotation has been employed.

The modulator of this invention has been used as an external modulator for a laser coherent light source, and is particularly useful for this purpose since the non-resonant multiple-reflective light path is a low Q propagation path and its associated losses are relatively disassociated from the laser light cavity. The modulator of this invention may also be used as an external modulator for a non-coherent source of light. A mathematical development for this latter case shows that the ratio of intensity of the output light ($I_{out}$) to the intensity of plane polarized input light ($I_{in}$) is equal to $$\frac{I_{out}}{I_{in}} = \frac{(TR_2)\sin^2\phi}{1-(TR_1R_2)\cos^2\phi} \quad (1)$$

where T is the double-pass transmittance of the light cavity, that is $T=(1-\alpha)$ where $\alpha$ is the double-pass attenuation factor of the cavity, $R_1$ and $R_2$, respectively, are the reflectivities of the mirrors 11 and 12, and $\phi$ is the relative phase retardation of the orthogonal components of the plane polarized light for a single pass through the crystal and the eighth-wave plate and is proportional to the modulating voltage magnitude for an electro-optic crystal.

Figure 3:
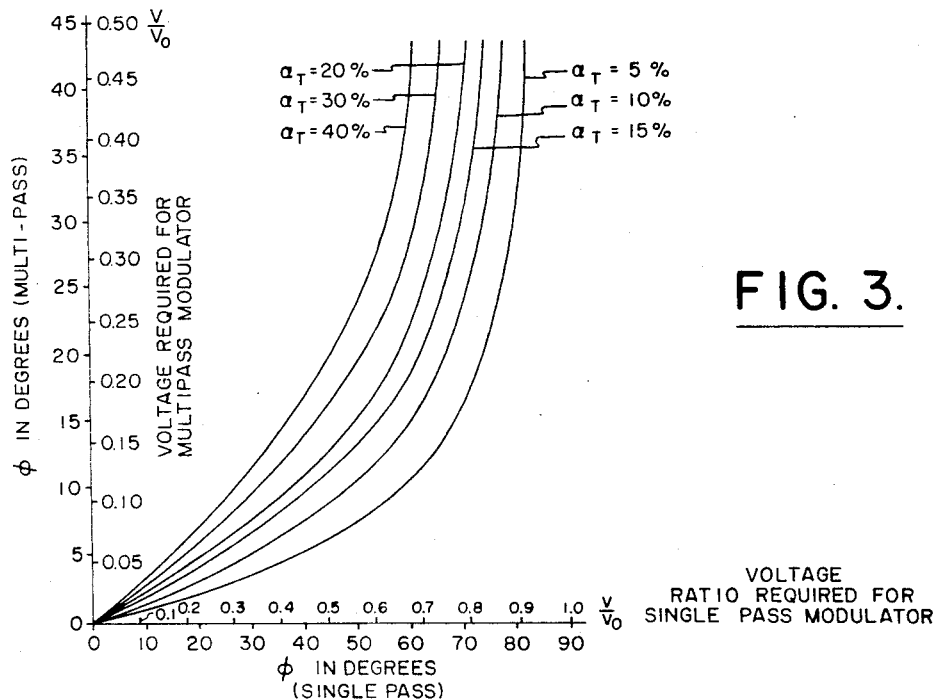
FIGS. 3 and 4 are graphs illustrating the properties of the modulator of this invention in comparison to the properties of a known prior art modulator.

The improvement in performance of the modulator of this invention over the prior art single pass, or non-reflective, modulator may be determined by use of the following expression which is a variation of Equation 2 with $\phi$ replaced by $$\frac{V}{V_o}\cdot\frac{\pi}{2}$$

$$\frac{I_{out}}{I_{in}} = \frac{(1-\alpha)\sin^2\left(\frac{V}{V_o}\cdot\frac{\pi}{2}\right)}{1-(1-\alpha)\cos^2\left(\frac{V}{V_o}\cdot\frac{\pi}{2}\right)} \quad (2)$$

wherein V represents the magnitude of the voltage applied to the electro-optic crystal in the modulator and $V_o$ represents the magnitude of the modulator voltage required to produce 180° relative phase retardation through the electro-optic crystal, that is, a 90° angular rotation of the plane of polarization of the plane polarized light. FIG. 3 is a family of curves plotted from Equation 2 for several values of $\alpha$, wherein the abscissa is plotted in terms of the voltage ratio $V/Vo$ required to achieve a given relative phase retardation in a nonreflective modulator and the ordinate is plotted in terms of the ratio $V/Vo$ for the multipass modulator of this invention. As a specific example, assuming an attenuation factor of 15%, and assuming a relative phase retardation of 60 degrees for a single pass through the modulator, the voltage ratio required for the nonreflective modulator is approximately .67 and for the multipass modulator of this invention is approximately .22. This represents a decrease by a factor of 3 in the magnitude of the modulating voltage applied to the electro-optic crystal.

The limiting factor in the use of an electro-optic crystal as a modulator is the power dissipation properties of the crystal, which may be expressed by the equation $$P = V^2 2\pi FC \tan\delta$$

which is the equation for power dissipation for an imperfect dielectric. In the above expression, V is the magnitude of modulation voltage, F is the frequency of the modulating signal, C is the crystal capacitance, and $\tan\delta$ is the loss factor of the crystal. Because the voltage term in the above expression is squared, the above example taken from the curves of FIG. 3 indicate that for a given allowable power dissipation in a given crystal the modulator of this invention will permit an increase by the factor of 9 in the modulating frequency F, or for a given modulating frequency, the power loss in the crystal is decreased by a factor of 9. This type of improvement makes it possible and practical to extend the modulation frequency of the light modulator into the higher ranges of the microwave frequency spectrum.

Figure 4:
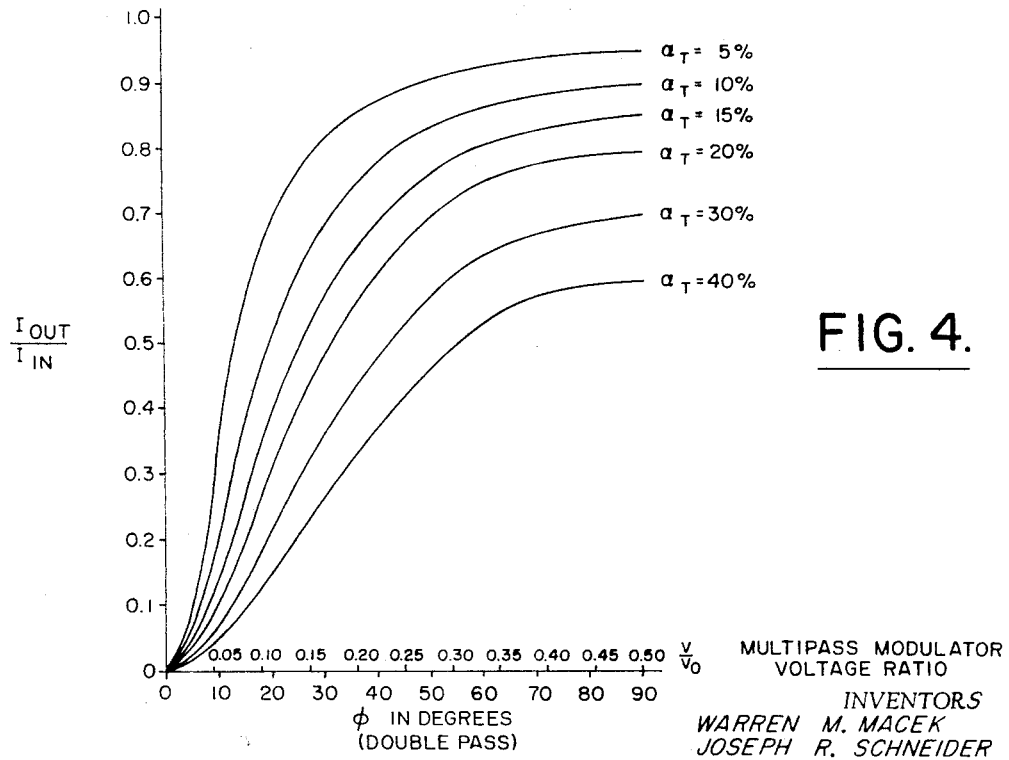

The intensity of the light output of the modulator of this invention as a function of the modulating voltage magnitude is illustrated in FIG. 4 for various attenuation factors.

The use of the term "nonresonant multiple-reflective light path" in this description is intended to be restrictive only in the sense that the optical path between mirrors 11 and 12 should not exhibit the characteristics of a Fabry-Perot interferometer. If the external modulator of this invention did in fact function as a Fabry-Perot interferometer it would be strongly coupled to the laser light cavity and would heavily load the laser activity, which in most instances would be undesirable. If such were the case, it could be considered that the end mirror 12 of FIG. 1 constituted an end mirror of the laser activity and that the modulator actually was part of the laser activity. This is to be distinguished from the external modulator of this invention.

While the invention has been described in its preferred embodiments, it is to be understood that the words which

What is claimed is:

1. Light modulator for use in conjunction with a laser having a resonant cavity, said modulator comprising, first and second spaced light reflective surfaces aligned to provide a multiple-reflective light path outside of said resonant cavity, said path being non-resonant for light of the wavelength emitted from said laser, light polarizing-analyzing means positioned in said path for passing substantially without attenuation light that is plane polarized at a first angle and for transversely reflecting from said path, substantially without attenuation, light that is plane polarized at an orthogonal angle, means positioned in said multiple-reflective path for controllably producing an orthogonally polarized component of light from light incident thereon from opposite directions along said path, and means for controlling said last-named means to vary the magnitude of said orthogonally polarized component in a desired manner.

2. Light modulator for use in conjunction with a laser having a resonant cavity, said modulator comprising, first and second spaced light reflective surfaces aligned to provide a multiple-reflective light path outside of said resonant cavity, said path being non-resonant for light of the wavelength emitted from said laser, a light polarizing-analyzing means positioned in said path for passing substantially without attenuation light that is plane polarized at a first angle and for passing orthogonally polarized light substantially without attenuation along a second path that is different from said multiple-reflective path, means positioned in said multiple-reflective path for controllably producing an orthogonally polarized component of light from light incident thereon from opposite directions along said path, and means for controlling said last-named means to vary the magnitude of said orthogonally polarized component in a desired manner.

References Cited

UNITED STATES PATENTS

| | | | |
|---|---|---|---|
| 3,200,698 | 8/1965 | Froome et al. | 88—61 X |
| 3,229,223 | 1/1966 | Miller | 88—61 X |
| 3,239,670 | 3/1966 | Bloembergen | 88—61 X |

FOREIGN PATENTS 1,379,310  10/1964  France.

JEWELL H. PEDERSEN, *Primary Examiner.*

E. BAUER, *Assistant Examiner.*